(12) United States Patent
Kim et al.

(10) Patent No.: US 10,160,474 B2
(45) Date of Patent: Dec. 25, 2018

(54) TELESCOPIC LATCH APPARATUS OF STEERING COLUMN FOR VEHICLE

(71) Applicant: Hyundai Motor Company, Seoul (KR)

(72) Inventors: Beom Soo Kim, Seoul (KR); Dong Han Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 16 days.

(21) Appl. No.: 15/421,959

(22) Filed: Feb. 1, 2017

(65) Prior Publication Data

US 2018/0057036 A1   Mar. 1, 2018

(30) Foreign Application Priority Data

Aug. 24, 2016 (KR) .......................... 10-2016-0107528

(51) Int. Cl.
| | | |
|---|---|---|
| *B62D 1/184* | (2006.01) | |
| *B62D 1/185* | (2006.01) | |
| *B62D 1/19* | (2006.01) | |

(52) U.S. Cl.
CPC ............. *B62D 1/184* (2013.01); *B62D 1/185* (2013.01); *B62D 1/192* (2013.01); *B62D 1/195* (2013.01)

(58) Field of Classification Search
CPC ......... B62D 1/184; B62D 1/192; B62D 1/185
See application file for complete search history.

(56) References Cited

U.S. PATENT DOCUMENTS

| | | | | |
|---|---|---|---|---|
| 6,419,269 B1* | 7/2002 | Manwaring | ............ | B62D 1/184 |
| | | | | 280/775 |
| 7,052,043 B2* | 5/2006 | Lee | ........................ | B62D 1/184 |
| | | | | 280/775 |
| 2008/0023952 A1* | 1/2008 | Manwaring | ............ | B62D 1/195 |
| | | | | 280/777 |
| 2012/0266716 A1 | 10/2012 | Sulser et al. | | |
| 2017/0008545 A1* | 1/2017 | Hong | ..................... | B62D 1/187 |
| 2017/0043802 A1 | 2/2017 | Hong et al. | | |
| 2017/0361862 A1* | 12/2017 | Charvet | ................. | B62D 1/184 |

FOREIGN PATENT DOCUMENTS

| | | |
|---|---|---|
| JP | H 0899640 A | 4/1996 |
| KR | 10-1026119 B1 | 3/2011 |
| KR | 10-1028318 B1 | 4/2011 |
| KR | 10-2011-0096827 A | 8/2011 |
| KR | 10-1412191 B1 | 6/2014 |
| KR | 10-1559821 B1 | 10/2015 |
| KR | 10-1593592 B1 | 2/2016 |
| WO | WO 2015/167234 A1 | 11/2015 |
| WO | WO 2016/142482 A1 | 9/2016 |
| WO | WO 2017/045916 A1 | 3/2017 |

\* cited by examiner

*Primary Examiner* — Darlene P Condra

(74) *Attorney, Agent, or Firm* — Morgan, Lewis & Bockius LLP

(57) ABSTRACT

A telescopic latch apparatus of a steering column for a vehicle is provided, wherein supporting force against a collision load is more constantly maintained while the steering column collapses, by structurally increasing the supporting force during the initial period of the collapse, in respect to a telescopic structure of the steering column, and thus increasing the amount of collision load (collapse load) initially absorbed by the steering column, and reducing a difference between the supporting force during the initial period of the collapse and the supporting force during the middle and late periods of the collapse after the initial period of the collapse at the time of a vehicle collision.

7 Claims, 6 Drawing Sheets

<CROSS SECTION TAKEN ALONG LINE A-A>

TELESCOPIC LATCH APPARATUS OF STEERING COLUMN FOR VEHICLE

CROSS-REFERENCE TO RELATED APPLICATION

The present application claims priority to Korean Patent Application No. 10-2016-0107528 filed on Aug. 24, 2016, the entire contents of which is incorporated herein for all purposes by this reference.

BACKGROUND OF THE INVENTION

Field of the Invention

The present invention relates to a telescopic latch apparatus of a steering column for a vehicle. More particularly, it relates to a telescopic latch apparatus of a steering column for a vehicle, which is improved such that supporting force against a collision load is more constantly maintained while the steering column collapses, by structurally increasing the supporting force during the initial period of collapse, in respect to a telescopic structure of the steering column, and thus reducing a difference between the supporting force during the initial period of collapse and the supporting force during the middle and late periods of collapse after the initial period of collapse at the time of a vehicle collision.

Description of Related Art

A steering system for a vehicle has a steering wheel which is provided in an interior of the vehicle and allows a driver to steer the vehicle, and a steering column, which is used to transmit a steering effort of the driver to vehicle wheels, is connected to the steering wheel.

The steering system has a tilting device which adjusts a height of the steering wheel to meet a body condition of the driver, and a telescopic device which adjusts an interval between the steering wheel and the driver by moving the steering column in an axial direction.

Therefore, the steering column provides the user with convenience associated with the tilting and telescopic functions, and collapses at the time of a vehicle collision in order to reduce collision energy. In this case, the steering column is divided into an 'operating unit' which is movable, and a 'fixed unit' which is fixed to a vehicle body.

In more detail, the fixed unit refers to a part which is coupled to the vehicle body by means of a mounting bracket and the like and thus, does not move from the initial period of the collision to the late period of the collision even though the steering column collapses due to the vehicle collision. When the steering column collapses, the operating unit absorbs collision energy while collapsing, and in this case, the point in time of the collapse varies for each part of the operating unit. A part of the operating unit (a shaft housing of the steering column) collapses while moving within a telescopic section during the initial period of the collapse, and the remaining part thereof collapses while moving after the initial period of the collapse.

However, the operating unit has a disadvantage in that collision energy, which is absorbed when the operating unit moves within the telescopic section during the initial period of the collapse, is less than collision energy which is absorbed when the operating unit moves after the initial period of the collapse.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a telescopic latch apparatus of a steering column for a vehicle, which is improved such that supporting force against a collision load is more constantly maintained while the steering column collapses, by structurally increasing the supporting force during the initial period of the collapse, in respect to a telescopic structure of the steering column, and thus increasing the amount of collision load (collapse load) initially absorbed by the steering column, and reducing a difference between the supporting force during the initial period of the collapse and the supporting force during the middle and late periods of the collapse after the initial period of the collapse at the time of a vehicle collision.

Various aspects of the present invention are directed to providing a telescopic latch apparatus of a steering column for a vehicle, which has a telescopic function for moving the steering column in an axial direction, the telescopic latch apparatus including: a first telescopic latch which is fixed to an outside circumferential surface of the steering column; and a second telescopic latch which is mounted on a column bracket that supports the steering column, and engaged with the first telescopic latch to restrict an axial movement of the steering column.

In addition to unlocking force of a telescopic lever which is typically configured to restrict the axial movement of the steering column, the present invention adopts the telescopic latch apparatus, and as a result, it is possible to implement movement restricting force for restricting the axial movement of the steering column.

In an exemplary embodiment, the first telescopic latch may be provided with first gear teeth, the second telescopic latch may be provided with second gear teeth that mesh with the first gear teeth, and the first gear teeth may be provided with a predetermined length in the axial direction of the steering column.

Since the gear teeth structure is applied to the first telescopic latch and the second telescopic latch, it is possible to implement a desired level of force for restricting the axial movement of the steering column, and it is possible to absorb impact having predetermined intensity or higher when the impact occurs.

In particular, with the structure in which the first gear teeth and the second gear teeth, which are provided with a predetermined length, are engaged with each other, it is possible to easily implement predetermined movement restricting force for restricting the axial movement of the steering column at the time of a vehicle collision, and the state in which the first gear teeth and the second gear teeth are engaged with each other is ensured over a predetermined section, and impact absorption is enabled during the state.

In another exemplary embodiment, the second telescopic latch may be mounted to be penetrated by a telescopic bolt provided on the column bracket, and supported to be in close contact with the column bracket by elastic force applied by a spring member provided on the telescopic bolt.

Fixing force for fixing the second telescopic latch is provided by utilizing the telescopic bolt configured to implement the locking and unlocking operations of the telescopic lever, and the spring member is configured to bring the second telescopic latch into resilient and close contact with the column bracket to prevent the axial movement of the second telescopic latch when the telescopic lever performs the unlocking operation.

In still another exemplary embodiment, the steering column may be axially movably supported by an outer housing coupled to the column bracket, and a rotation of the second telescopic latch may be prevented by a guide hole provided in the outer housing.

When the second telescopic latch is rotated due to the unlocking operation of the telescopic lever, there may occur a problem in that the first telescopic latch and the second telescopic latch cannot normally mesh with each other when the telescopic lever performs the locking operation. However, since the structure (guide hole) for preventing the rotation of the second telescopic latch is provided in the outer housing as described above, it is possible to prevent the problem of a failure to allow the first and second telescopic latches to mesh with each other.

In yet another exemplary embodiment, a curling plate, which moves simultaneously with the steering column when the steering column is moved in the axial direction, may be provided on the outside circumferential surface of the steering column, and when the steering column is moved in the axial direction in a state in which the second telescopic latch is fastened to the first telescopic latch, the curling plate may be deformed by interference with the first telescopic latch.

One end portion of the curling plate is attached and fixed to the outside circumferential surface of the steering column in a state in which one end portion of the curling plate is bent and inserted into a space between the first telescopic latch and the steering column, and the other end portion of the curling plate is disposed to be seated on the first telescopic latch.

In still yet another exemplary embodiment, the first telescopic latch may have a molding pin formed integrally with the outside circumferential surface of the steering column, and the first telescopic latch may be fixed to the outside circumferential surface of the steering column by the molding pin.

According to an exemplary embodiment of the present invention, the amount of collision load absorbed during the initial period is increased in respect to the telescopic structure of the steering column, such that it is possible to reduce a difference between the supporting force during the initial period of the collapse and the supporting force during the middle and late periods of the collapse after the initial period of the collapse at the time of a vehicle collision, and as a result, it is possible to more constantly maintain the supporting force against a collision load during the collapse.

In the instant case, it is possible to increase the supporting force during the initial period of the collapse without increasing an operator's effort for telescopic control of the steering column (an effort for operating the telescopic lever), and as a result, it is possible to expect an effect of improving marketability.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
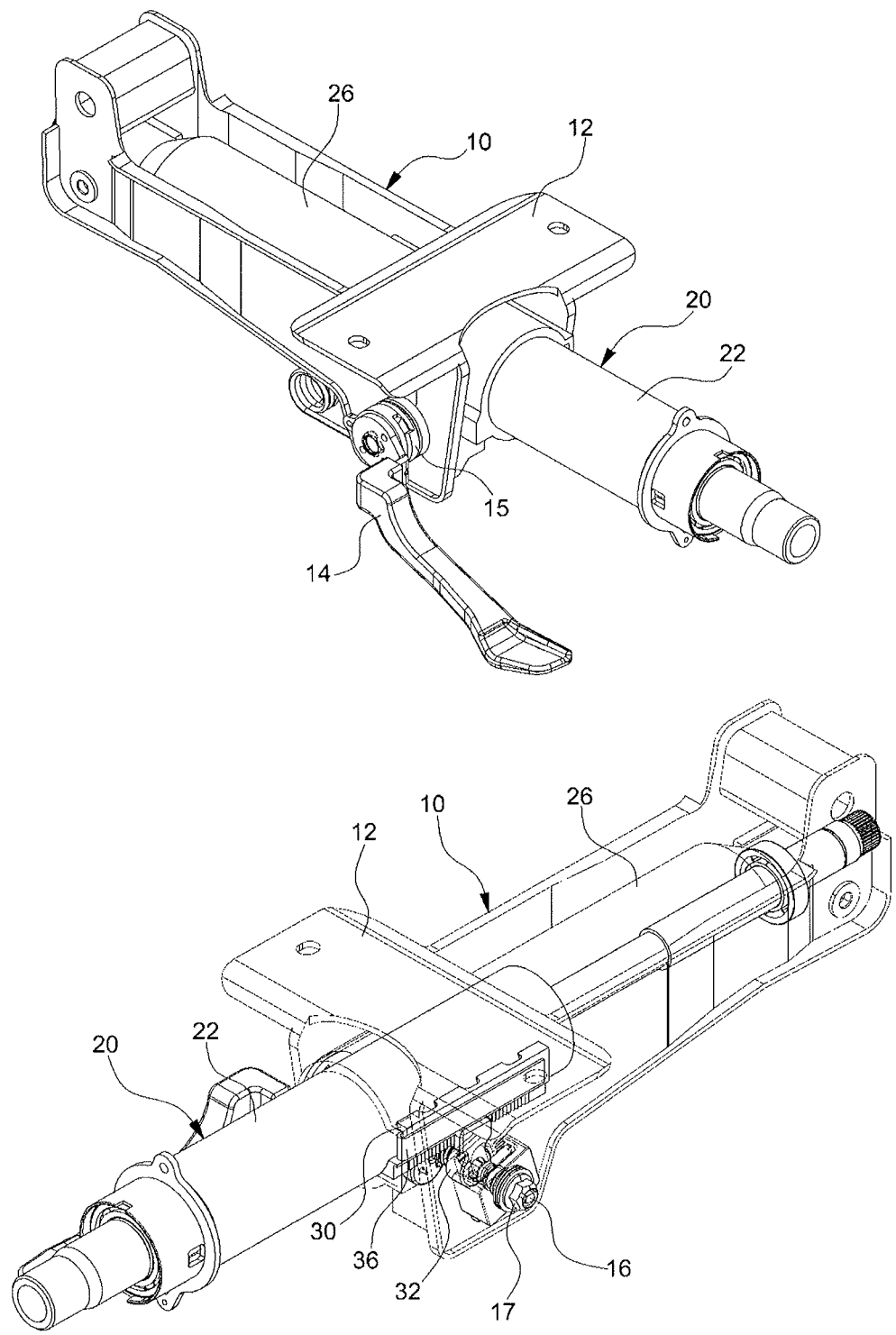
FIG. 1 and FIG. 2 are perspective views illustrating a state in which a telescopic latch apparatus of a steering column according to an exemplary embodiment of the present invention is assembled.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various embodiments of the present invention relates to a telescopic latch apparatus of a steering column for a vehicle, and a main object of the present invention is to increase the amount of collision energy initially absorbed by the steering column, by structurally increasing supporting force against a collision load when the steering column initially collapses, in respect to a telescopic structure of the steering column.

Hereinafter, an exemplary embodiment of the present invention will be described in detail with reference to the accompanying drawings.

Figure 2:
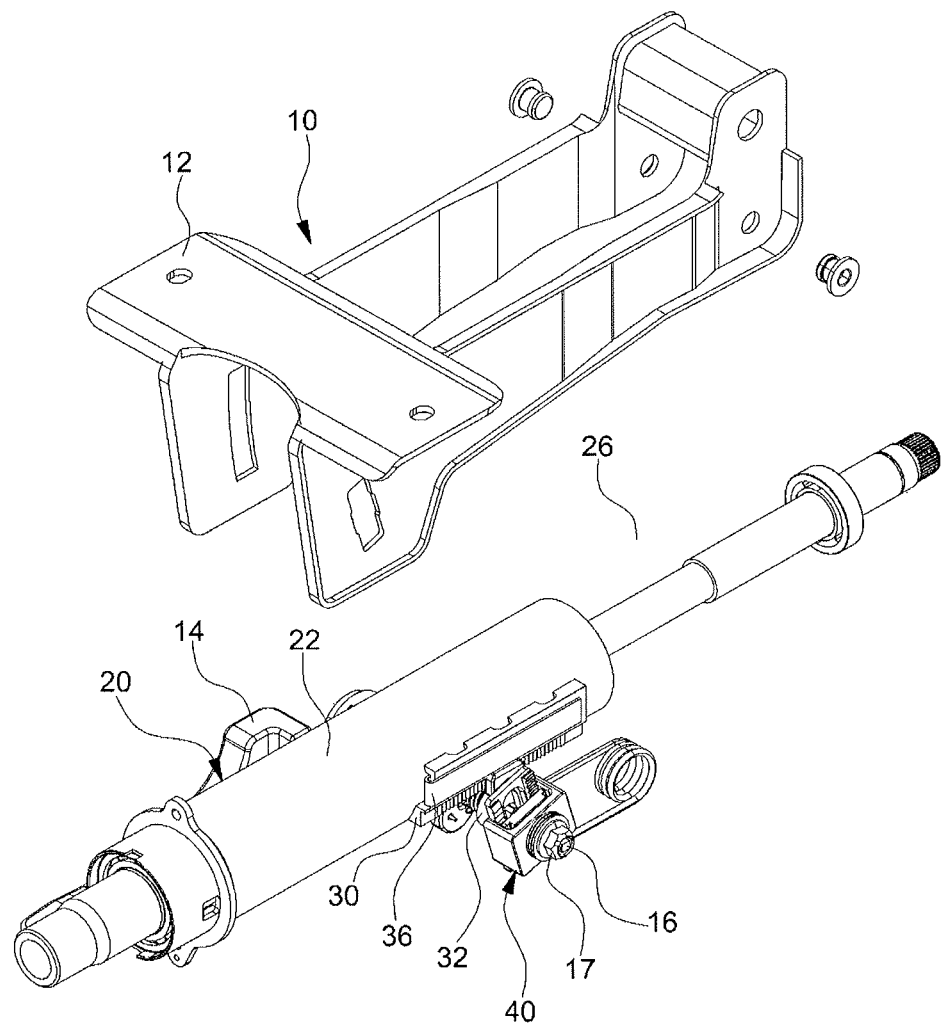
Figure 3:
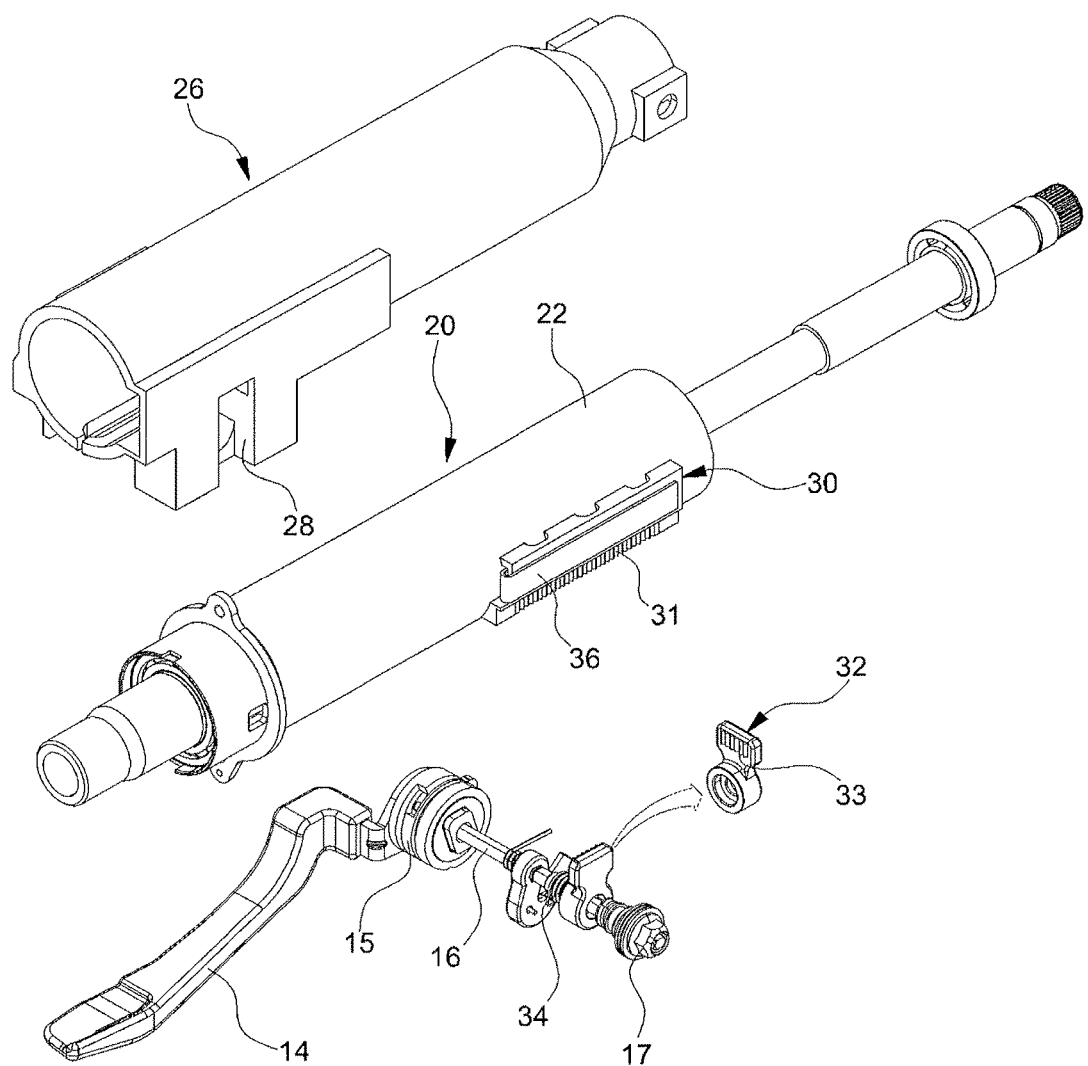
FIG. 3 is a partially exploded view illustrating a state in which the telescopic latch apparatus of the steering column according to the exemplary embodiment of the present invention is assembled.
Figure 4:
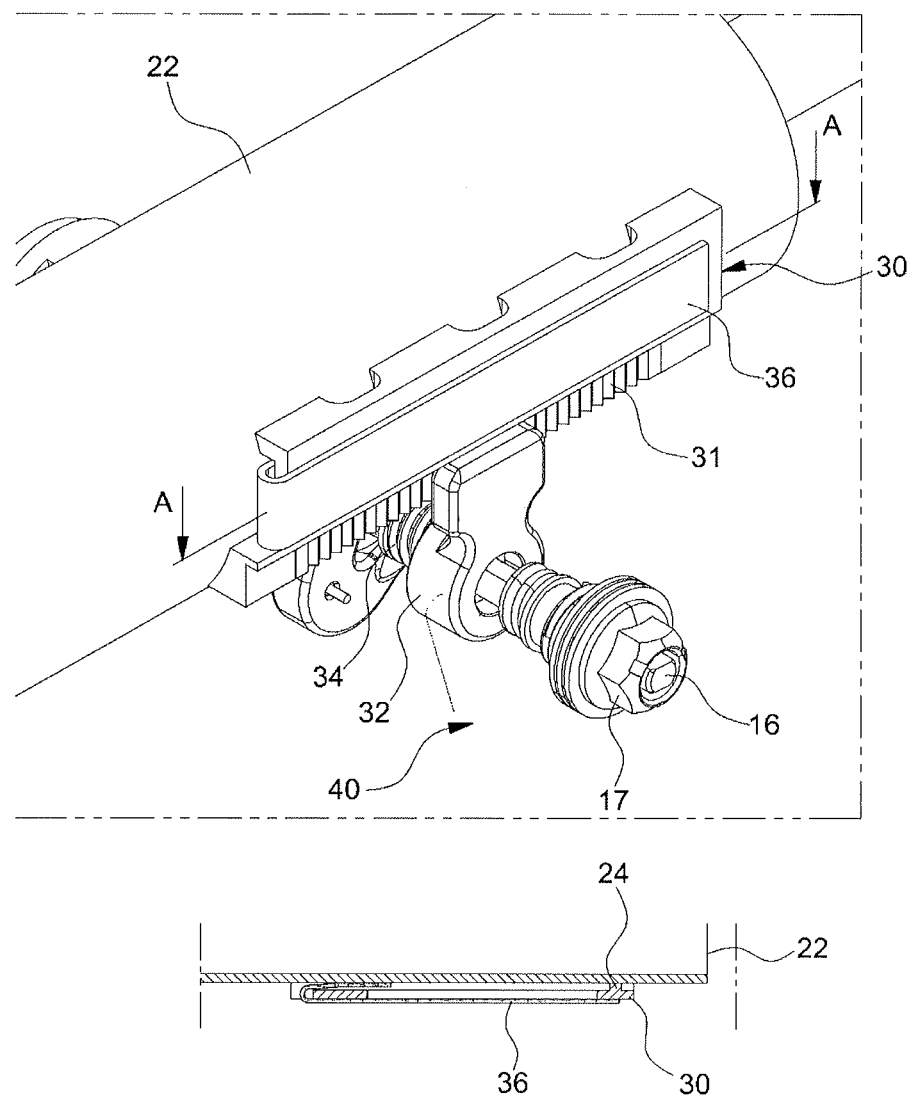
FIG. 4 and FIG. 5 are partially enlarged views illustrating a state in which the telescopic latch apparatus of the steering column according to the exemplary embodiment of the present invention is assembled.
Figure 5:
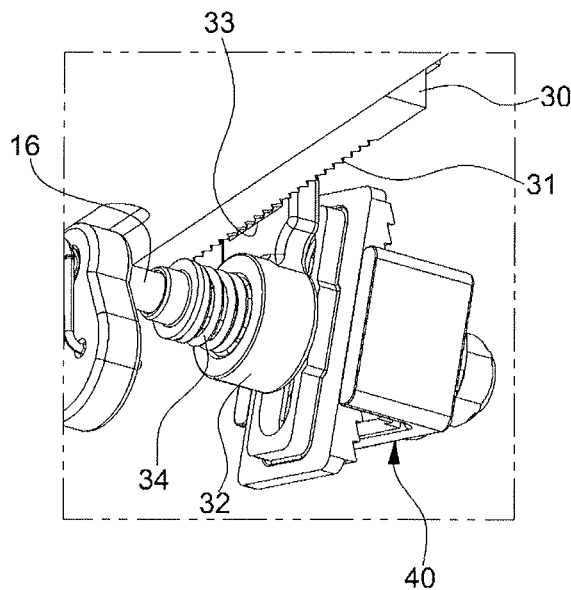
Figure 6:
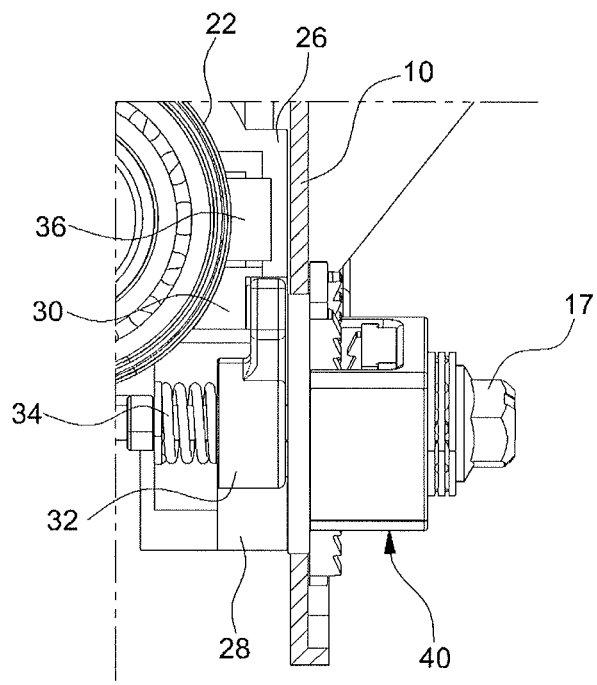
FIG. 6 is a partial cross-sectional view illustrating a state in which the telescopic latch apparatus of the steering column according to the exemplary embodiment of the present invention is assembled.

FIG. 1 and FIG. 2 illustrate a steering column 20, and a column bracket 10 which supports the steering column 20.

The column bracket 10 is fixedly coupled to a vehicle body by a mounting bracket 12 at an upper end portion of the column bracket 10, and supports the steering column 20.

An outer housing 26, which supports the steering column 20 so that the steering column 20 is movable in an axial direction, is provided between the column bracket 10 and the steering column 20, a shaft housing 22, which defines an outside structure of the steering column 20, is inserted into the outer housing 26 to be movable in the axial direction, the shaft housing 22 and the outer housing 26 are moved relative to each other to regulate a length along which the shaft housing 22 and the outer housing 26 overlap each other, and as a result, as a position of the steering column 20 in the axial direction is moved, a position of a steering wheel coupled to the steering column 20 in the axial direction may be adjusted, and thus a telescopic function of the steering column 20 is implemented.

The telescopic latch apparatus of the steering column according to an exemplary embodiment of the present invention may be applied to the steering column having the telescopic function, and may also be applied to a steering column having a tilting function as well as the telescopic function.

The telescopic latch apparatus according to an exemplary embodiment of the present invention has a function of locking and unlocking the telescopic function of the steering column 20. When a user operates a telescopic lever 14 to the unlocked state to move the steering column 20 in the axial direction, the restriction to the axial movement of the steering column 20 is removed, such that the telescopic function may be carried out. When the user operates the telescopic lever 14 to return the telescopic lever 14 back to the locked state, the axial movement of the steering column 20 is restricted, such that the telescopic function is restricted.

As illustrated in FIGS. 3 to 6, to implement the function of locking and unlocking the telescopic function, a first telescopic latch 30 is provided on an outside circumferential surface of the shaft housing 22, and a second telescopic latch 32 is provided on a telescopic bolt 16 and may be fastened to the first telescopic latch 30 by a meshing structure.

The first telescopic latch 30 has a molding pin 24 formed integrally with an outside circumferential surface of the steering column 20 (the outside circumferential surface of the shaft housing 22). The molding pin 24 is integrally or monolithically formed between the shaft housing 22 and the first telescopic latch 30 by injection molding the molding pin 24 after inserting the shaft housing 22 and the first telescopic latch 30 (in a state in which the molding pin is not formed), as insert members, into a mold, and the first telescopic latch 30 is fixed to the outside circumferential surface of the steering column 20 by the molding pin 24.

The first telescopic latch 30 has an approximately "⊏" shaped cross-sectional structure based on the circumferential direction of the shaft housing 22, both end portions of the first telescopic latch 30 in a width direction thereof are in surface-to-surface contact with the outside circumferential surface of the shaft housing 22, and a central portion of the first telescopic latch 30 is integrally connected with the outside circumferential surface of the shaft housing 22 through the molding pin 24.

Here, the molding pin 24 is formed to protrude radially and perpendicularly from the outside circumferential surface of the shaft housing 22, and integrally connects the first telescopic latch 30 and the shaft housing 22, and one end portion of a curling plate 36 to be described below is inserted into a space between the central portion of the first telescopic latch 30 and the outside circumferential surface of the shaft housing 22.

In addition, the first telescopic latch 30 has first gear teeth 31 to be fastened to the second telescopic latch 32.

The first gear teeth 31 are provided at one side of the first telescopic latch 30 based on the circumferential direction of the shaft housing 22 (e.g., one end portion of the first telescopic latch 30 in the width direction), formed to extend with a predetermined length in the longitudinal direction of the first telescopic latch 30 and the axial direction of the shaft housing 22, and disposed within a predetermined section of the steering column 20, such that a structure in which the first telescopic latch 30 and the second telescopic latch 32 are engaged with each other may be implemented before and after the steering column 20 moves in the axial direction.

The second telescopic latch 32 serves to restrict the axial movement of the steering column 20 by being engaged with and fastened to the first telescopic latch 30, second gear teeth 33, which mesh with the first gear teeth 31, are provided at one vertical side of the second telescopic latch 32 (e.g., one vertical end portion of the second telescopic latch 32), and the other vertical side of the second telescopic latch 32 (e.g., the other vertical end portion of the second telescopic latch 32) is fitted with and supported by the telescopic bolt 16.

The telescopic lever 14 and a fixing nut 17 are coupled to both end portions of the telescopic bolt 16, respectively, in a state in which the telescopic bolt 16 penetrates the column bracket 10, and simultaneously, the telescopic bolt 16 penetrates a lower portion of the outer housing 26 that surrounds the steering column 20, and restricts the axial movement of the outer housing 26.

In the instant case, the telescopic lever 14, which is coupled to one end portion of the telescopic bolt 16, is provided adjacent to one side of the column bracket 10 with a cam 15 interposed between the telescopic lever 14 and the column bracket 10, and the fixing nut 17, which is coupled to the other end portion of the telescopic bolt 16, is provided adjacent to the other side of the column bracket 10 with a tilt latch device 40 interposed between the fixing nut 17 and the column bracket 10.

The telescopic bolt 16 has a spring member 34 that provides elastic force to bring the second telescopic latch 32 into close contact with the column bracket 10 (the column bracket 10 and the tilt latch device 40 partially inserted into a hole of the column bracket 10), and the second telescopic latch 32, which is disposed between the spring member 34 and the column bracket 10, is supported by being in close contact with the column bracket 10 by the elastic force of the spring member 34.

Therefore, the second telescopic latch 32 is mounted and supported on the column bracket 10 so that the axial movement of the second telescopic latch 32 (in the axial direction of the steering column 20) is restricted.

A guide hole 28, which supports the second telescopic latch 32 to prevent a rotation of the second telescopic latch 32, is provided in the outer housing 26.

Therefore, the rotation of the second telescopic latch 32 is prevented by the guide hole 28 when the telescopic bolt 16 is linearly moved by the locking operation of the telescopic lever 14, and as a result, the second telescopic latch 32 may normally mesh with the first telescopic latch 30.

When the telescopic lever 14 performs the locking operation, the telescopic bolt 16 is linearly moved to one side in a left and right direction by the cam 15, and the second telescopic latch 32 is fastened to the first telescopic latch 30 through the meshing structure, and when the telescopic lever 14 performs the unlocking operation, the telescopic bolt 16 is linearly moved to the other side in the left and right direction by the cam 15, and the second telescopic latch 32 is separated from the first telescopic latch 30.

Meanwhile, the first telescopic latch 30 has the plate-shaped curling plate 36 which is fixedly attached to the outside circumferential surface of the steering column 20 (the outside circumferential surface of the shaft housing), and restricted integrally with the shaft housing 22.

The curling plate 36 is formed in a plate shape that has a slightly larger length than the first telescopic latch 30, and disposed to be seated on the central portion (which is the part having a space with the outside circumferential surface of the shaft housing 22) of the first telescopic latch 30 based on a radial direction of the shaft housing 22. The curling plate 36 is integrally and fixedly attached to the outside circumferential surface of the shaft housing 22 in a state in which one end portion in a longitudinal direction of the curling plate 36 is bent and then inserted into the space between the first telescopic latch 30 and the shaft housing 22.

The curling plate 36 is restricted as one end portion thereof, which is bent, is integrally attached to the shaft housing 22, and in this case, one end portion of the curling plate 36, which is bent to be caught by an end of the central portion of the first telescopic latch 30, is defined in consideration of a direction of a collision load to be applied at the time of a vehicle collision. To induce deformation of the curling plate 36 when the steering column 20 is moved in the axial direction by the collision load, the curling plate 36 passes through the space between the shaft housing 22 and the first telescopic latch 30 entirely from one end portion of the curling plate 36 (a portion attached to the shaft housing 22) to the other end portion thereof (a portion stacked on the central portion of the first telescopic latch 30).

Therefore, when the shaft housing 22 is moved in the axial direction in a state in which the first telescopic latch 30 and the second telescopic latch 32 are engaged with each other, in other words, in a state in which the first telescopic latch 30 is restricted by the second telescopic latch 32, the curling plate 36 is subjected to interference with the first telescopic latch 30, and the collision load is absorbed by deformation of the curling plate 36 which is caused by the interference.

In the case of the steering column 20 which adopts the telescopic latch apparatus configured as described above, when the telescopic lever 14 is rotated to the unlocked state, the telescopic bolt 16 is linearly moved in a direction in which the first telescopic latch 30 and the second telescopic latch 32 are unfastened, and as a result, the first and second telescopic latches 30 and 32, which are fastened by gear meshing, are unfastened, such that the steering column 20 is movable in the axial direction.

In the instant case, when the telescopic lever 14 is rotated back to the locked state after the position of the axial movement of the steering column 20 is adjusted to the posture of the driver, the telescopic bolt 16 is linearly moved in a direction in which the first telescopic latch 30 and the second telescopic latch 32 mesh with each other, and as a result, the first and second telescopic latches 30 and 32 are fastened by gear meshing, such that the axial movement of the steering column 20 is restricted again.

Figure 7:
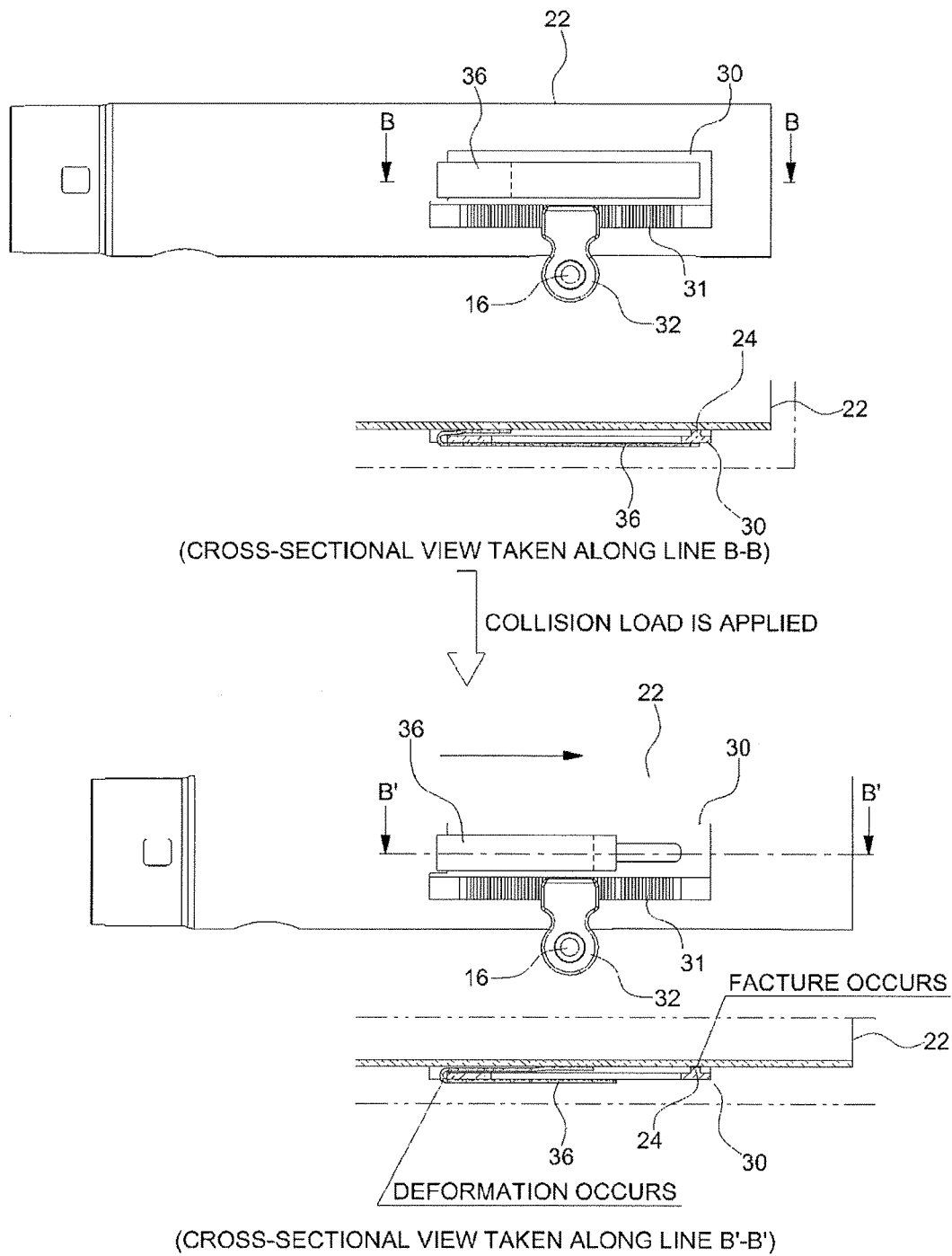
FIG. 7 is a partial view illustrating a state in which the telescopic latch apparatus of the steering column according to the exemplary embodiment of the present invention initially absorbs a collision load.

Meanwhile, when a vehicle collision occurs and a collision load is applied to the steering column 20 in a state in which the telescopic lever 14 is operated to the locked state and the axial movement of the steering column 20 is restricted, the molding pin 24 disposed between the shaft housing 22 of the steering column 20 and the first telescopic latch 30 is fractured because the first telescopic latch 30 is in the state of being restricted by the second telescopic latch 32, and the shaft housing 22 is moved in the axial direction toward the vehicle body, as illustrated in FIG. 7.

In this case, one end portion of the curling plate 36 is integrally moved while being restricted by the shaft housing 22, and as a result, the other end portion of the curling plate 36 is deformed to be bent to pass through the space between the shaft housing 22 and the first telescopic latch 30.

In more detail, since one end portion of the curling plate 36, which is integrally attached to the outside circumferential surface of the shaft housing 22, is moved integrally and simultaneously with the shaft housing 22, the other end portion of the curling plate 36 enters the space between the outside circumferential surface of the shaft housing 22 and the first telescopic latch 30, and the other end portion of the curling plate 36, which enters the space, is deformed, absorbing collision energy.

Therefore, the amount of absorbed collision load is increased because of the fracture of the molding pin 24 and the deformation of the curling plate 36 during the initial period of the collapse of the steering column 20, and as a result, it is possible to increase the collision load during the initial period of the collapse to a level equal to the collision loads during the middle and late periods after the initial period of the collapse, and in the instant case, it is possible to increase supporting force of the steering column 20 during the initial period of the collapse without increasing a user's operating effort for operating the telescopic lever 14.

In other words, with the application of the telescopic latch apparatus according to an exemplary embodiment of the present invention, the initial collision load (collapse load) is increased because of fracture force of the molding pin 24 and deforming force of the curling plate 36 as well as the supporting force of the column bracket 10, and as a result, it is possible to absorb collision energy through the supporting force which is maintained at the same level within the entire section where the collapse occurs, and in the instant case, since the effort for operating the telescopic lever 14 is not increased, it is possible to prevent the user from inconvenience by the increase in the operating effort.

In more detail, with the telescopic latch apparatus according to an exemplary embodiment of the present invention, the amount of collision energy initially absorbed at the time of a vehicle collision is increased by increasing the supporting force against the shaft housing 22, which moves in the axial direction, when implementing the telescopic function of the steering column 20. Further, since the amount of absorbed collision energy is increased from the initial period of the collision, the collision energy is relatively uniformly absorbed while the steering column collapses in comparison with the existing case (where the telescopic latch is not applied), uniformly dispersing the collision load.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A telescopic latch apparatus of a steering column for a vehicle, which telescopically moves the steering column in an axial direction thereof, the telescopic latch apparatus comprising:
    a first telescopic latch which is fixed to an outside circumferential surface of the steering column; and
    a second telescopic latch which is mounted on a column bracket that supports the steering column, and engaged with the first telescopic latch to restrict the axial movement of the steering column,
    wherein the first telescopic latch has a molding pin formed integrally with the outside circumferential surface of the steering column.

2. The telescopic latch apparatus of claim 1, wherein the first telescopic latch is provided with first gear teeth, and the second telescopic latch is provided with second gear teeth that mesh with the first gear teeth.

3. The telescopic latch apparatus of claim 2, wherein the first gear teeth is provided with a predetermined length in the axial direction of the steering column.

4. The telescopic latch apparatus of claim 1, wherein the second telescopic latch is mounted to be penetrated by a telescopic bolt provided on the column bracket, and supported to be in contact with the column bracket by elastic force applied by an elastic member provided on the telescopic bolt.

5. The telescopic latch apparatus of claim 1, wherein the steering column is axially movably supported by an outer housing coupled to the column bracket, and a rotation of the second telescopic latch is prevented by a guide opening provided in the outer housing.

6. The telescopic latch apparatus of claim 1, wherein a curling plate, which moves simultaneously with the steering column when the steering column is moved in the axial direction, is provided on an outside circumferential surface of the steering column, and when the steering column is moved in the axial direction in a state in which the second telescopic latch is fastened to the first telescopic latch, the curling plate is deformed by interference with the first telescopic latch.

7. The telescopic latch apparatus of claim 6, wherein a first end portion of the curling plate is fixed to the outside circumferential surface of the steering column in a state in which the first end portion of the curling plate is bent and inserted into a space between the first telescopic latch and the steering column, and a second end portion of the curling plate is disposed on the first telescopic latch.

* * * * *